April 28, 1936. E. V. CROWELL Re. 19,952
APPARATUS FOR CEMENTING WELLS
Original Filed July 26, 1927
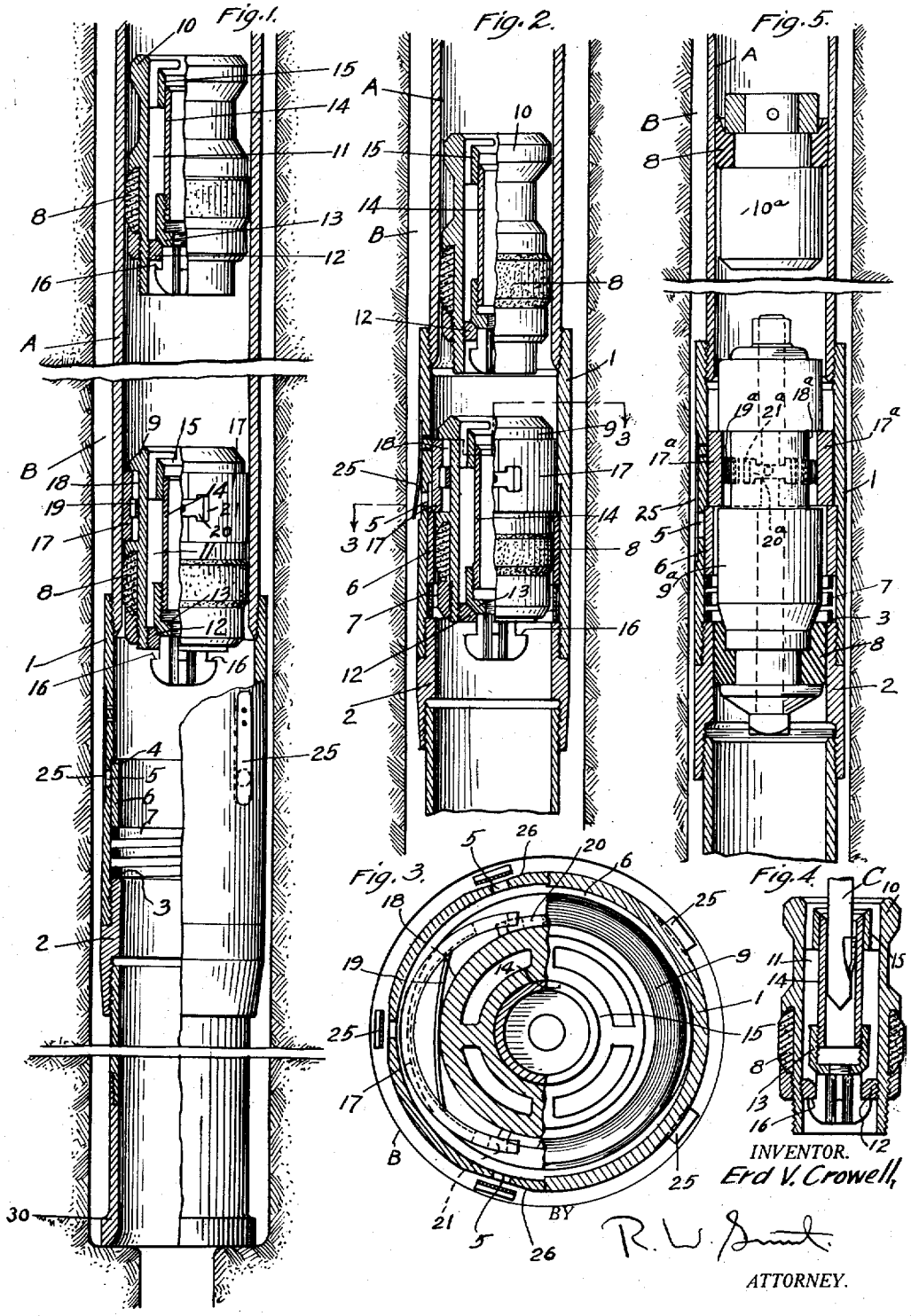
INVENTOR.
Erd V. Crowell,
BY
R. W. Smith
ATTORNEY.

Reissued Apr. 28, 1936

Re. 19,952

UNITED STATES PATENT OFFICE 19,952

APPARATUS FOR CEMENTING WELLS

Erd V. Crowell, Los Angeles, Calif.

Original No. 1,828,099, dated October 20, 1931, Serial No. 208,539, July 26, 1927. Application for reissue January 23, 1933, Serial No. 653,110

13 Claims. (Cl. 166—1)

This invention is an improvement in the method and apparatus for cementing wells, the present application being a continuation in part of Patent Number 1,828,098, granted to me October 20, 1931, application for which as Serial Number 171,851, filed March 1, 1927, was co-pending at the time of the original on which application for this reissue is based. The present invention relates to a method and apparatus which provides for carrying on drilling operations or insuring circulation of a washing medium downwardly through the bore of a string of casing all the way to its lower end and thence upwardly in the surrounding well bore, and then forcing a cementing mixture downwardly through the casing to a predetermined level and thence outwardly through peripheral casing ports to fill the surrounding bore.

In practice where the formation is subject to cavings and consequent choking of the well bore as the casing is being lowered, it is usual to clear the well bore by circulating a washing medium, and it has been found essential to proper clearing of a bore in this manner that the mud-fluid forming the washing medium be circulated downwardly through the casing all the way to its lower end and thence outwardly through the lower end of the casing and upwardly around the same in order to provide or maintain an open bore through which the casing may be lowered.

Consequently, it has been found imperative that the peripheral casing ports through which cement is discharged into the surrounding bore subsequent to lowering the casing, be provided with normally closed valvular means which are not subject to being opened by pressure of the washing medium in the casing and which will consequently insure circulation of the washing medium all the way to the lower end of the casing, the said valvular means, however, being adapted to be opened subsequent to the washing operation to permit discharge of a cementing mixture through the open ports, but preferably including means for preventing return flow of material from the surrounding well bore into the casing.

It is therefore the particular object of the present invention to provide a string of casing with a section having positively closed peripheral ports and a bore not materially obstructed adapted for flow of a circulating medium downwardly therethrough past the closed ports and around the lower end of the casing and thence upwardly in the surrounding well bore, the closure means for the ports being adapted for engagement by an actuating plug which is lowered in the bore of the casing subsequent to the washing operation in order to actuate the closure means and open the ports for discharge of a cementing mixture, and the plug being anchored by its engagement with the closure means so as to close the bore of the casing below the open ports and thereby insure discharge of all of the cement outwardly through the open ports and into the surrounding well bore without any of the cement flowing downwardly through the casing below the anchored plug.

It is a further object of the invention to provide for removal of the actuating plug subsequent to the cementing operation so as to again present a substantially unobstructed casing bore, the plug being removable either by employing a plug which may be drilled out or by use of a plug which may be readily recovered from the well by a suitable tool.

It is a still further object of the invention to employ, if desired, a traveling plug in conjunction with the actuating plug, the traveling plug being forced down the well casing in back of the quantity of cement which is to be discharged into the surrounding well bore so as to force the cement outwardly through the casing ports which are held open by the anchored plug.

It is a still further object of the invention to provide the casing ports with auxiliary valvular means adapted to open by pressure of the material discharged outwardly through the ports when their plug-actuated closure means have been unseated, but adapted to close against return flow of material into the casing from the surrounding well bore irrespective of the position of the plug-actuated closure means.

Further objects of the invention will be readily understood from the following description of the accompanying drawing showing preferred embodiments of the invention and in which:

Fig. 1 is a vertical section through a well bore showing the invention in position prior to the cementing operation.

Fig. 2 is a similar view with the parts in position for the cementing operation.

Fig. 3 is a transverse section on the line 3—3 of Fig. 2.

Fig. 4 is a vertical section through one of the recoverable plugs, showing the method of removing the same.

Fig. 5 is a view similar to Fig. 1 but showing a modified construction.

A usual string of casing A is adapted to be lowered in the well bore B, and the bore of the casing may have a washing medium circulated downwardly therethrough and upwardly in the surrounding well bore, and the casing is then cemented off to provide a standard well construction.

A fixed section 1 of the string of casing is positioned therein at any predetermined level and preferably has a bore of slightly greater diameter than the remainder of the string; and at its lower end the section 1 is connected to the string by a coupling 2 forming an internal supporting shoulder 3. Medially of its length the bore of the fixed section preferably forms an undercut shoulder 4, and ports 5 open through the wall of the fixed section just below this undercut shoulder. The ports 5 are normally closed by a sleeve valve 6 slidable in the lower end of the bore of section 1 with the bore of the sleeve valve forming a uniform continuation of the bore of the string of casing; and the sleeve valve is yieldably shifted upwardly to close the ports and abut against shoulder 4 by means of a coil spring 7 upon which the sleeve valve rests and which is in turn supported upon shoulder 3.

The spring 7 retains the sleeve valve in elevated, closed position irrespective of pressure in the string of casing, but the sleeve is adapted to be lowered against the tension of its spring so as to open ports 5 by means of an actuating plug which is lowered in the string of casing so as to engage and depress sleeve 6 and then anchor on the sleeve with the ports open.

The actuating plug when thus anchored closes the bore of the casing just below the open ports 5, and as a consequence a cementing mixture introduced into the string of casing in back of the anchored plug is prevented from flowing downwardly through the casing past the plug and is discharged through open ports 5 into the surrounding well bore. A predetermined quantity of the cementing mixture is preferably thus discharged through the open ports, the quantity of cement being measured by a traveling plug lowered in the casing in back of the cement, and in order to prevent leakage past either the actuating plug or the traveling plug they are preferably each provided with suitable packing (shown at 8) whereby they form a fluid-tight but sliding fit in the well casing.

The plugs are adapted to be removed subsequent to the cementing operation so as to again provide a substantially unobstructed casing bore, and for this purpose the actuating plug 9 and the traveling plug 10 shown in Figs. 1 to 4 may be recovered from the well by use of a suitable tool, while the actuating plug 9a and the traveling plug 10a shown in Fig. 5 are adapted to be drilled out for clearing the bore of the casing.

The destructible plugs 9a—10a are preferably solid structures formed of a wood which may be readily drilled through, and the recoverable plugs 9—10 are preferably provided with normally closed valves which are adapted to open when the plugs are withdrawn so as to allow any fluid above the plugs to pass therethrough and thus eliminate all swabbing action.

As an instance of this arrangement, the plugs 9—10 have open bores 11 provided with valve seats 12 at their lower ends, and valves 13 are adapted to normally engage the valve seats for closing the bores of the plugs. The valves are retained in closed position by pressure above the plugs as they are lowered in the well casing, but when the plugs are withdrawn the valves are lifted to open position by operatively engaging their valve stems 14. The valve stems are hollow tubing extending upwardly from the valves and sliding in guides 15 at the upper ends of the hollow bores of the plugs, and these stems are adapted for engagement by a usual tubing spear C as shown in Fig. 4 when the plugs are to be withdrawn, so that elevation of the valve stems will first open valves 13 and then withdraw the plugs by engagement of depending abutments 16 of the valves against the undersides of valve seats 12.

The actuating plugs 9—9a have peripheral abutment slips which automatically expand when the plugs have been lowered into the slightly enlarged bore of section 1 in order that said slips may impinge against sleeve valve 6 for depressing the same to open ports 5 and then anchor the plugs on the sleeve. These abutment slips are shown in Figs. 1 and 5, respectively, as pairs of arcuate slips 17 and 17a which are adapted to contract in annular recesses 18 and 18a in plugs 9—9a as the plugs are lowered through the string of casing; and bias springs 19 shown in Fig. 1 or coil springs 19a shown in Fig. 5 are positioned in back of the slips so as to yieldably urge the same to expanded position where they will operatively engage sleeve valve 6. Expansion of the slips is preferably guided and limited by abutments 20—20a on plugs 9—9a slidably engaging in notches 21—21a in slips 17—17a.

In addition to the positive closure means for ports 5 which is formed by the sleeve valve 6 opening only through engagement by the actuating plug, the ports are preferably provided with auxiliary closure means at the exterior of section 1 of the casing, the said auxiliary closure means being adapted to open by pressure of material discharged outwardly through ports 5 when sleeve valve 6 has been opened, but automatically closing against back flow of material through the ports and into the casing irrespective of the position of valve 6. The auxiliary closure means shown as spring strips 25 are fixed at one end to flattened surfaces 26 at the exterior of casing section 1, with the opposite swinging ends of the strips overlying and normally closing ports 5. Pressure of material discharged outwardly through the ports is thus adapted to swing the strips outwardly as shown in Fig. 2 for opening the ports, but as soon as all the material has been discharged through the ports the resiliency of the spring strips again closes the same to prevent back flow into the casing.

In operation the well casing presents a uniform substantially unobstructed bore prior to the lowering of plug 9 or 9a, with ports 5 closed by sleeve valve 6 which is held in closed position by its spring 7 and irrespective of pressure in the casing. Drilling may then be continued or the casing may be washed down, as, for example, by the methods disclosed and claimed in my copending reissue applications, Serial No. 642,617, filed November 14, 1932, and Serial No. 648,819, filed December 24, 1932, the closed ports 5 preventing passage therethrough of the washing medium and thereby insuring its circulation all the way to the bottom of the casing and outwardly around the lower end of a casing shoe 30 or the like for clearing away obstructing material and thence upwardly in the surrounding well bore. The well bore having been cleared, the casing may be lowered to the formation seat and the actuating plug lowered in the casing, as shown in Fig. 1. When the actuating plug reaches the valve sleeve 6, it depresses the same to open ports 5, and by anchoring on the depressed sleeve valve it closes the bore of the casing below the open ports, the parts in this position being shown in Fig. 2. The cementing mixture is then introduced into the casing, the quantity of cement being measured by lowering the traveling plug in back of the same, and the traveling plug is forced downwardly in suitable manner, so that the cement flows outwardly through the open ports, the auxiliary valves 25 readily opening by the pressure of the flow for discharge of the cement into the surrounding well bore. The cement having been discharged, the valves 25 automatically close to prevent back flow into the casing, and the plugs may then be removed either by drilling them out or recovering the same, as previously described, whereupon the valve 6 will again close and the string of casing will thus provide a usual cemented well structure with the bore of the casing unobstructed and the ports in its wall positively held in closed position irrespective of pressure in the casing.

I have thus provided extremely simple but practical means for circulating a washing medium downwardly through well casing past a ported section of the casing so as to circulate the washing medium downwardly and around the bottom of the casing and thence upwardly outside the same to wash the casing free, the ports in the casing remaining closed irrespective of the pressure in the casing but adapted to be opened by mechanical means subsequent to the washing operation when it is desired to cement the well.

I claim:

1. Well casing having a series of ports; valvular means inside said casing tending normally to maintain closure of said ports; a plug carrying means slidably fitting and closing the bore of said casing at points of peripheral contact therewith; pressure means to force said plug downwardly through the casing; and means adapted to arrest the downward movement of said plug below said ports.

2. Well casing having a series of ports; valvular means tending normally to maintain closure of said ports; a plug carrying means slidably fitting and closing the bore of said casing at its points of peripheral contact therewith; pressure means to force said plug downwardly through said casing; means adapted for actuation on the downward movement of said plug to open said ports; and a stop for said plug below said valvular means adapted to arrest the downward movement of said plug.

3. Well casing having ports intermediate its upper and lower ends; valvular means controlling said ports; a plug carrying means slidably fitting and closing the bore of said casing at points of peripheral contact therewith; fluid pressure means in said casing above said plug and adapted to force it downwardly through said casing; means in said casing adapted to be actuated on the downward movement of said plug to open said ports; and means within said casing below said valvular means to arrest the downward movement of said plug and thus to close the bore of said casing below said ports by the sliding fit of the plug with said casing bore.

4. Well casing, having a series of ports, outwardly opening valvular means on said casing tending normally to maintain closure of said ports, but yieldable to pressure within the casing, a plug carrying means slidably fitting and closing the bore of said casing, pressure means to force said plug downwardly through said casing, and means, maintaining an open bore through the casing to arrest the downward movement of said plug below said ports.

5. Well casing having ports intermediate its upper and lower ends, valvular means controlling said ports, a plug carrying means slidingly fitting and closing the bore of said casing; fluid pressure means in said casing above said plug adapted to force it downwardly through said casing, means within said casing, maintaining an opening through the bore thereof to arrest the downward movement of said plug below said ports, thus closing the bore of the casing by the sliding fit of said plug with said casing bore, and pressure means to actuate said valvular means to first open said ports and then to force pressure fluid therethrough into the annular space outside the casing.

6. Well casing provided with a series of lateral ports, outwardly opening valves controlling said ports, means tending normally to maintain closure of said ports by said valves, a plug carrying means slidingly fitting and closing the bore of said casing, pressure means to force said plug downwardly through said casing, and means to arrest the downward course of said plug below said ports, thus preventing by the sliding fit of said plug with said casing downward flow of pressure fluid through the bottom of said casing, and deflecting such pressure fluid through said ports.

7. Well casing having a series of ports intermediate its upper and lower ends; valvular means tending normally to maintain closure of said ports; a plug carrying means slidably fitting and closing the bore of said casing at points of peripheral contact therewith and adapted to be moved by fluid-pressure means downwardly therethrough and by pressure on said valvular means in its downward course to open said ports; means below said ports to arrest the downward movement of said plug and thus close the bore of said casing by the sliding fit of the plug with said casing bore.

8. Well casing having a series of ports, valvular means inside said casing tending normally to maintain closure of said ports; a plug carrying means slidably fitting and closing the bore of said casing at points of peripheral contact therewith; pressure means to force said plug downwardly through the casing to cause the opening of said ports; and means to arrest the downward movement of said plug below said ports.

9. Well casing having a ported section; a sleeve valve carried by said ported section and controlling a port therein; a spring normally tending to elevate the sleeve valve for maintaining closure of said port; a plug slidably fitting and closing the bore of said casing at points of peripheral contact therewith; means carried by said plug for engaging and depressing said sleeve valve to open the port when the plug is forced downwardly through the casing; means in said casing below said port to arrest the downward course of said plug through said casing and thus to close the bore of said casing below said port.

10. Well casing having a ported section; a sleeve-valve carried by said ported section; a spring tending normally to actuate said sleeve valve to maintain closure of said port; a plug slidingly fitting and closing the bore of said casing at points of peripheral contact therewith and adapted when forced downwardly through said casing to actuate said sleeve valve to open said port; means to arrest the downward course of said plug through said casing to close the bore of said casing below said port by the sliding fit of said plug with said casing.

11. Well casing having a ported section; a sleeve-valve carried by said ported section; a spring tending normally to actuate said sleeve-valve to maintain closure of said port; a plug carrying means slidingly fitting and closing the bore of said casing and adapted when forced downwardly through said casing to open said port; fluid pressure means to force said plug downwardly through said casing; and means below said port to arrest the downward course of said plug through said casing and thus to close the bore of said casing below said port by the sliding contact with said casing of said means carried by said plug.

12. Well casing having a ported section; a sleeve-valve, not obstructing the bore of the casing, carried by said ported section; yieldable means tending to axially shift the sleeve valve so as to close the port; and means slidingly fitting the bore of the casing actuated by fluid pressure to, first, engage and axially shift the sleeve-valve for opening the port and, second, to close the bore of the casing below the port by the sliding fit of said means with said casing.

13. Well casing having a ported section; a sleeve-valve controlling a port from the inside to the outside of said casing and normally actuated to maintain closure of said port by a spring located on an abutment of said casing; a plug carrying means slidingly fitting and closing the bore of said casing and adapted when forced by fluid pressure downwardly therethrough by direct contact with said sleeve-valve to actuate the same to open said port against the tension of said spring; and means maintaining an opening through the bore of said casing to arrest the downward movement of said plug in said casing below said port, thus closing the bore of said casing by the sliding fit of said plug therewith.

ERD V. CROWELL.